United States Patent [19]

Sutt, Jr.

[11] Patent Number: 5,865,585
[45] Date of Patent: Feb. 2, 1999

[54] ANGLED CHISEL POINT BRAD AND METHOD THEREFOR

[75] Inventor: Edward G. Sutt, Jr., Winnetka, Ill.

[73] Assignee: Illinois Tool Works Inc., Glenview, Ill.

[21] Appl. No.: 882,768

[22] Filed: Jun. 26, 1997

[51] Int. Cl.[6] .......................... F16B 15/08; F16B 39/00
[52] U.S. Cl. ......................... 411/442; 411/966; 206/343
[58] Field of Search ................... 411/442, 443, 411/444, 966; 206/343, 344, 345

[56] References Cited

U.S. PATENT DOCUMENTS

| | | |
|---|---|---|
| 161,280 | 5/1875 | Rogers . |
| 190,575 | 5/1877 | Goddu . |
| 200,839 | 3/1878 | Prusha . |
| 312,691 | 2/1885 | Woodward et al. . |
| 328,103 | 10/1885 | Boyd . |
| 599,933 | 3/1898 | Goddu . |
| 653,266 | 7/1900 | Sherwood . |
| 1,416,971 | 5/1922 | Osborne . |
| 1,605,204 | 11/1926 | Beegle . |
| 1,680,351 | 8/1928 | Warne . |
| 1,733,506 | 10/1929 | Maynard . |
| 3,835,991 | 9/1974 | Brecht ..................................... 411/442 |
| 4,664,733 | 5/1987 | Masago . |
| 5,380,250 | 1/1995 | Dion ..................................... 411/443 X |
| 5,615,985 | 4/1997 | Rose et al. .............................. 411/442 |

FOREIGN PATENT DOCUMENTS 8808087  10/1988  WIPO ..................................... 411/443

OTHER PUBLICATIONS

Jim Britton, "Survey of Finish Nailers", Fine Homebuilding, Oct./Nov. 1995, pp. 72–77.

Primary Examiner—Neill Wilson
Attorney, Agent, or Firm—Schwartz & Weinrieb

[57] ABSTRACT

An obliquely collated strip of brads useable in an angled magazine of a fastener driving tool, each brad having a head on one end and a point on an opposite end, the point of each brad of the collated strip of brads having a tip defined by converging first, second and third facets so as to form an edge at an acute angle relative to an axis of the brad, the edge of each brad forming a substantially continuous edge of the collated strip of brads, the head of each brad of the collated strip of brads arranged step-wise relative to the head of an adjacent brad, the step-wise arrangement of heads forming a stepped edge substantially parallel to the substantially continuous edge of the collated strip of brads, the head of each brad of the collated strip of brads being disposed at an angle relative to the axis of the brad, the angle of the head sloping oppositely relative to the angle of the substantially continuous edge of the collated strip of brads.

18 Claims, 3 Drawing Sheets

1

ANGLED CHISEL POINT BRAD AND METHOD THEREFOR

CROSS-REFERENCE TO RELATED APPLICATION

The present patent application is related to co-pending U.S. application Ser. No. 08/883,087 filed on Jun. 26, 1997, entitled "Pneumatic Trim Nailer" commonly assigned herewith and incorporated by reference herein.

1. Field of the Invention

The present invention relates generally to brads useable in a fastener driving tool, and methods therefor for producing the same, and more particularly to obliquely collated strips of brads useable in fastener driving tools having an aftwardly swept magazine, and combinations thereof.

2. Background of the Invention

The parallel arrangement of brads in a collated strip for use in fastener driving tools is generally known. The collated strip of brads is usually made coherent by means of a suitable adhesive material, such as, for example, nitrocellulose, and is disposed in a magazine of the fastener driving tool wherein individual brads are sequentially fed into a channel of a nose-piece thereof. A driver blade is accelerated axially through the channel behind the brad and into engagement therewith so as to separate the brad from the collated strip and discharge the brad from an aperture of the nose-piece into a target material or workpiece, usually grained wood or particle board. Many powered finishing nail, or brad, driving tools have the magazine oriented at a right angle relative to the channel in the nose-piece. Other fastener driving tools advantageously aftwardly sweep the magazine from the nose-piece at an angle relative to the channel therein so as to improve clearance about the nose-piece and to facilitate handling and operation of the fastener driving tool, particularly while performing nailing operations in closed spaces, such as along corners of intersecting walls and ceilings. A fastener driving tool having a swept magazine configuration for accommodating a collated strip of brads is disclosed in co-pending U.S. Application No. _____ filed on _____, entitled "Pneumatic Trim Nailer" which is incorporated herein by reference thereto.

To accommodate fastener driving tools having an aftwardly swept magazine, the collated strip of brads must be arranged obliquely so that a leading edge of the collated strip of brads has substantially the same angular relationship, usually within two degrees more or less, to the longitudinal axis of the brad as the channel of the fastener driving tool nose-piece has to the magazine. U.S. Pat. No. 4,664,733 entitled "Method of Manufacturing Cohered Fasteners" issued on 12 May 1987 to Masago, for example, discloses a machine for offsetting a plurality of preformed fasteners adhered together with a plasticized adhesive coating so as to form a strip of obliquely cohered fasteners before the adhesive coating hardens. The result is a collated strip of brads arranged obliquely and having a first stepped edge formed by the plurality of brad points and a second stepped edge formed by the plurality of brad heads. The point of each brad has a straight edge symmetrically formed by converging surfaces extending from opposite sides of the brad, wherein the edge is perpendicular to the longitudinal axis of the brad and is parallel to an upper surface of the head. The process of U.S. Pat. No. 4,664,733 however requires complex machinery and additional processing steps that increase production costs.

Other known methods of forming obliquely collated strips of brads for use in fastener driving tools having an aftwardly swept magazine include forming points on a parallel arrangement of wire members with a stepped cutting die oriented at an appropriate angle relative to the longitudinal axes of the wire members. According to these alternative methods, heads of the brads are formed on an opposite end portion of the wires with a stepped heading die, wherein the end portions of the wire members on which the heads are formed are cut with the same stepped cutting die used to form the points. In the known prior art, the point of each brad is formed either having a straight edge defined by converging surfaces extending from opposite sides of the brad as in U.S. Pat. No. 4,664,733, or the point of each brad is formed having a flat surface perpendicular to the longitudinal axis of the brad. In both configurations, however, the resulting obliquely collated strip of brads has a stepped edge formed by the plurality of brad points and another stepped edge formed by the plurality of brad heads, wherein each individual brad is configured substantially the same as those discussed above in connection with U.S. Pat. No. 4,664,733. Although these alternative methods of forming obliquely collated strips of brads has advantages over the method of U.S. Pat. No. 4,664,733, including reduced manufacturing costs, they are nevertheless subject to some drawbacks. More particularly, the stepped cutting dies are expensive to fabricate. Additionally, variation in the diameter of the wire members causes misalignment of the stepped cutting and stepped heading dies relative to ends of the wire members during the cutting and heading operations. Misalignment of the stepped cutting die results in over-cutting of some wire members and incomplete cutting of others, which causes excessive wear on the cutting die and may prevent proper separation of the formed obliquely collated strip of brads from the wire members during the manufacture thereof. Misalignment of the stepped heading die results in the formation of incomplete and distorted heads on the cut wire members, and causes excessive wear on the stepped heading die.

In addition to the problems discussed above, the inventor of the present invention recognizes that improperly formed brads are susceptible to jamming in the channel of the nose-piece, and moreover are a suspected cause of poor penetration performance, possibly resulting from slippage of the driver blade off the head during fastening operations and from poorly formed points. Notably, in the past, it was generally believed that fastener points must be formed symmetrically in order to ensure adequate and accurate penetration into the workpiece, and that asymmetrically formed fastener points had an increased tendency to be deflected from the surface of the workpiece, a phenomenon referred to as skating. Asymmetrically formed points were also believed to be more susceptible to influence by wood grain, sometimes piercing through a side of the workpiece, which is an adverse effect known as shining.

The present invention is drawn to advancements in the art of brads formable into an obliquely collated strips of brads, combinations thereof, and methods of making the same, which overcome problems in the prior art.

OBJECTS OF THE INVENTION

It is thus an object of the present invention to provide a novel angled chisel point brad useable in a fastener driving tool, the brad having a head at one end and a point at an opposite end, the point having a tip defined by converging first, second and third facets, one or both of the first and second facets converging from corresponding first and second sides of the shank so as to form an edge at an acute angle relative to the longitudinal axis of the shank, the third facet formed by a third side of the shank, and in another configuration the tip is formed by, as a surface at an acute angle relative to the longitudinal axis of the shank, by two opposite sides and an end of the shank.

It is also an object of the invention to provide a novel brad useable in a fastener driving tool, the brad having a head at one end and a point at an opposite end, the head of the brad having a top surface which is disposed at an angle relative to the longitudinal axis of the brad, whereby the angled head has a tendency to prevent a driver blade of the fastener driving tool from slipping off the head while driving the brad into a workpiece.

It is another object of the invention to provide a novel angled chisel point brad useable in a fastener driving tool, the brad having a head at one end and a point at an opposite end, the point having a tip defined by converging first, second and third facets, one or both of the first and second facets converging from corresponding substantially opposite first and second sides of the shank so as to form an edge at an acute angle relative to a the longitudinal axis of the shank, the third facet formed by a third side of the shank, the head of the brad having a top surface which is disposed at an angle relative to the longitudinal axis of the brad, and the angle of the head sloping oppositely relative to the angle of the edge, whereby the novel angled chisel point brad has relatively improved penetration performance resulting from the angled chisel point and provides better contact between a driver blade of the fastener driving tool and the angled head.

It is another object of the invention to provide a novel obliquely collated strip of brads useable in an angled magazine of a fastener driving tool, each brad having a head on one end and a point on an opposite end, the point of each brad of the collated strip of brads having a tip defined by converging first, second and third facets so as to form an edge at an acute angle relative to the longitudinal axis of the brad, wherein the edge of each brad of the collated strip of brads forms a substantially continuous edge of the collated strip of brads.

It is a further object of the invention to provide a novel obliquely collated strip of brads useable in an angled magazine of a fastener driving tool, each brad having a head on one end and a point on an opposite end, the point of each brad of the collated strip of brads having a tip defined by converging first, second and third facets so as to form an edge at an acute angle relative to the longitudinal axis of the brad, the edge of each brad of the collated strip of brads forming a substantially continuous edge of the collated strip of brads, the head of each brad of the collated strip of brads arranged step-wise relative to the head of an adjacent brad, the step-wise arrangement of heads forming a stepped edge substantially parallel to the substantially continuous edge, and according to an alternative embodiment of the invention, the head of each brad of the collated strip of brads is disposed at an angle relative to the longitudinal axis of the brad, the angle of each head sloping oppositely relative to the angle of the substantially continuous edge of the collated strip of brads.

It is still a further object of the invention to provide a novel method of making an obliquely collated strip of brads useable in a magazine of a fastener driving tool by forming a first substantially continuous edge on a plurality of collectively arranged wire members disposed at an acute angle relative to the respective longitudinal axes of the plurality of wire members, forming a head on each of the plurality of wire members, forming a second substantially continuous edge on the plurality of wire members at an angle relative to the respective longitudinal axes of the plurality of wire members, the second substantially continuous edge forming a point with a tip on each of the plurality of wire members, whereby the second substantially continuous edge is substantially parallel to the first substantially continuous edge.

It is yet another object of the invention to provide a novel method of making an obliquely collated strip of brads that includes forming the head of each of the plurality of wire members step-wise relative to the head of an adjacent wire member, whereby the step-wise arrangement of heads on each of the plurality of collectively arranged wire members forms a stepped edge of the plurality of collectively arranged wire members which is substantially parallel to the second substantially continuous edge of the plurality of collectively arranged wire members.

It is still another object of the invention to provide a novel method of making an obliquely collated strip of brads that includes forming the head of each of the plurality of wire members at an angle relative to the longitudinal axis of the wire member, the angle of each head sloping oppositely relative to the angle of the continuous edge of the plurality of collectively arranged wire members.

BRIEF DESCRIPTION OF THE DRAWING

These and other objects, features, aspects and advantages of the present invention will become more fully apparent upon careful consideration of the following Detailed Description of the Invention and the accompanying Drawings, which may be disproportionate for ease of understanding, wherein like structure and steps are referenced by corresponding numerals and indicators throughout the several views, and wherein:

FIG. 3b is an end view taken along lines 3b—3b of FIG. 3a.

FIG. 3c is an opposite end view taken along lines 3c—3c of FIG. 3a.

DETAILED DESCRIPTION OF THE INVENTION

Figure 1:
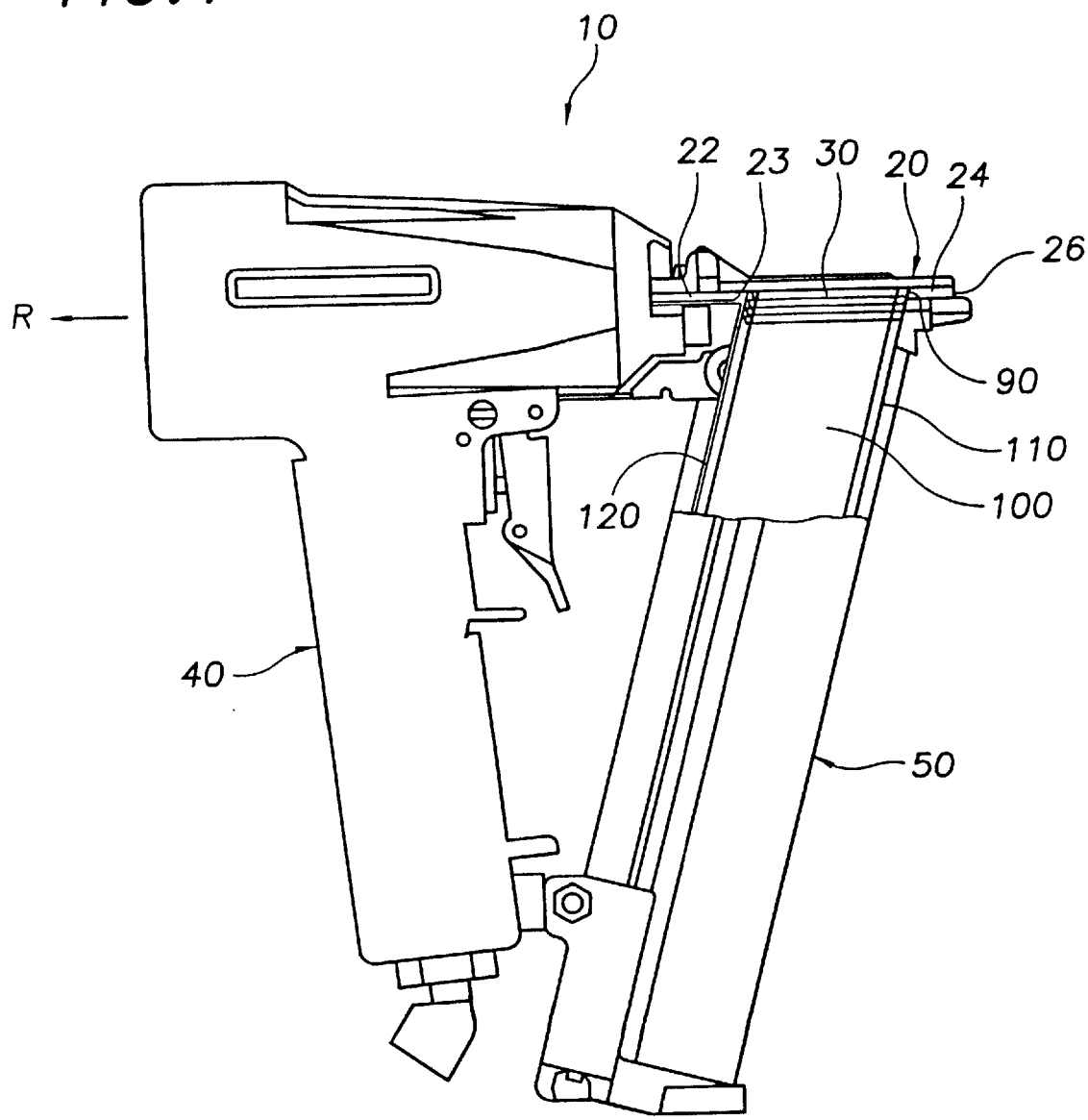
FIG. 1 is a partially sectioned side elevational view of a powered fastener driving tool having an aftwardly swept magazine useable for driving brads arranged in an obliquely collated strip of brads according to the present invention.

FIG. 1 is a partial sectional view of a powered fastener driving tool 10 useable for driving brads arranged in an obliquely collated strip of brads. The fastener driving tool 10 useable for this purpose has a driver blade 22 extendable along its longitudinal axis through a channel 24 of a nose-piece 20 and into engagement with an endmost fastener, or brad, 30 disposed within the channel so as 24 to separate the endmost brad 30 from the obliquely collated strip of brads 100 and discharge the brad 30 from an aperture 26 of the nose-piece 20 into a target material or workpiece, like so as, for example, wood, not shown in the drawing. The exemplary fastener driving tool 10 of FIG. 1 is of the type disclosed more fully in co-pending U.S. Application No.___ ___ filed on ___, entitled "Pneumatic Trim Nailer" commonly assigned herewith and incorporated herein by reference, but the objects, features, aspects and advantages of the present invention are applicable to any obliquely collated strips of fasteners useable in fastener driving tools having an aftwardly swept magazine.

The fastener driving tool 10 includes a handle 40 extending substantially radially from the longitudinal axis of the driver blade 22. In the exemplary embodiment, the handle 40 is disposed along a substantially perpendicular radial relative to the axis of the driver blade 22, but the handle 40 may be disposed at some angle relative to the axis of the driver blade 22. The fastener driving tool 10 also includes a magazine 50 disposed at an angle relative to the longitudinal axis of the driver blade 22 for receiving and feeding individual brads 30 of the collated strip of brads 100 to the channel 24 of the nose-piece 20. FIG. 1 shows the magazine 50 extending aftwardly from the nose-piece 20 toward and below the handle 40, wherein the handle 40 and the magazine 50 are disposed on substantially the same side of the driver blade 22, as discussed further below.

Figure 2:
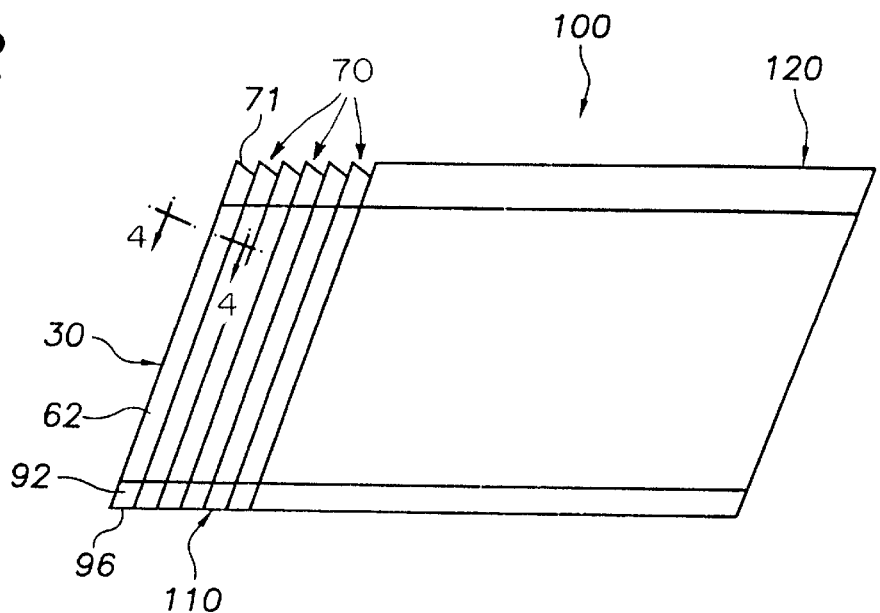
FIG. 2 is a side elevational view of an obliquely collated strip of brads useable in an aftwardly swept magazine of a fastener driving tool according to an exemplary embodiment of the invention.
Figure 3A:
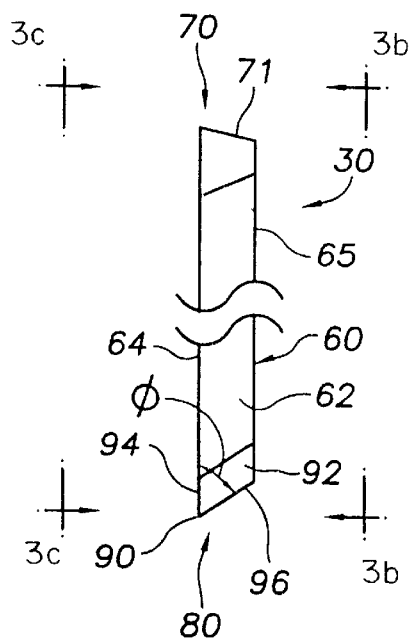
FIG. 3a is a side elevational view of an individual brad of the obliquely collated strip of brads of FIG. 1.
Figure 3B:
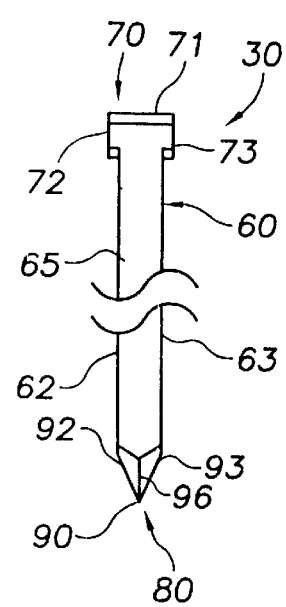
Figure 3C:
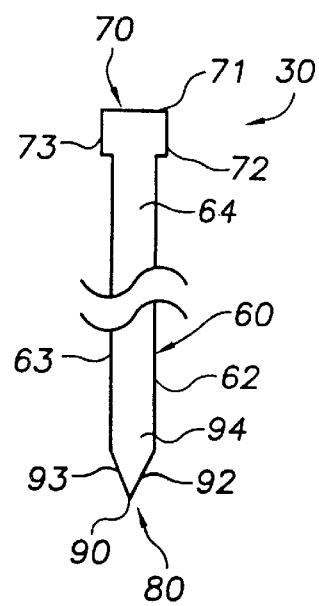
Figure 4:
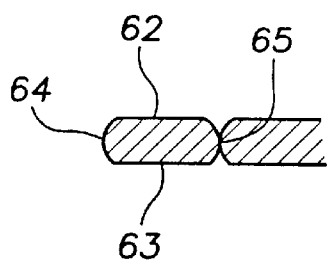
FIG. 4 is a partial sectional view taken along lines 4—4 of FIG. 1.

FIG. 2 shows an obliquely collated strip of brads 100 useable in a fastener driving tool having an angled magazine, and FIGS. 3a–3c illustrate various views of a single brad 30 of the obliquely collated strip of brads of FIG. 2. More particularly, each brad 30 includes a shank 60 with a longitudinal axis having a head 70 at a first end and a point 80 at a second opposite end. FIG. 4 shows the shank 60 of each brad 30 having a race-track shaped cross-section, but the shank 60 may alternatively have other cross-sectional shapes including square, rectangular, polygonal, round, oval and Turk's-head shapes. Thus according to the exemplary race-track configuration of FIG. 4, the shank 60 has opposite first and second sides 62 and 63, which are parallel surfaces, and the shank 60 also includes first and second curved ends 64 and 65 between and connecting the opposite sides 62 and 63.

The point 80 of the brad 30 has a tip 90 defined by a first facet 92, a second facet 93, and a third surface 94, wherein at least one or both of the first and second facets 92 and 93 are angled from corresponding substantially opposite first and second sides 62 and 63 of the shank 60 so as to form an edge 96 which is disposed at an angle Φ relative to the longitudinal axis of the shank 60. The third surface 94 is formed by a third side of the shank 60, wherein the third side of the shank is one of the first or second curved ends 64 or 65 of the shank 60. The facets 92, 93 and surface 94 forming the tip 90 may have planar or curved surfaces, and the point 80 is asymmetric with respect to the longitudinal centerline of the shank 60 when viewed from either of the sides 62 and 63.

In the exemplary embodiment, the first curved end 64 of the shank is the third side of the shank 60, wherein the third surface 94 is formed by the first curved end 64. FIGS. 3a–3c show the first and second facets 92 and 93 of the tip 90 being substantially planar, and the third surface 94 of the tip curved. In other embodiments, however, the third surface 94 may also be planar, for example where the shank 60 has a square or rectangular cross-sectional shape. FIGS. 3a–3c also show the first and second facets 92 and 93 converging from the corresponding first and second opposite sides 62 and 63 of the shank 60 so as to form the edge 96 substantially symmetrically between the first and second opposite sides 62 and 63.

Figure 3D:
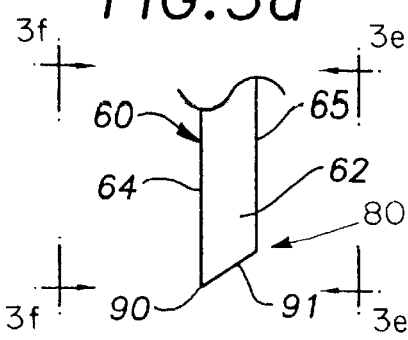
FIG. 3d is a side elevational view of an alternative point configuration of an individual brad of the obliquely collated strip of brads of FIG. 1.
Figure 3E:
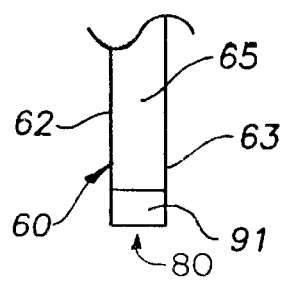
FIG. 3e is an end view taken along lines 3e—3e of FIG. 3d.
Figure 3F:
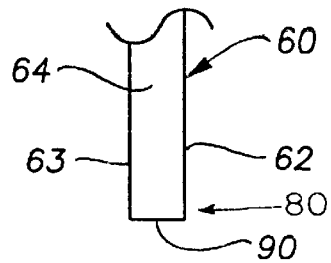
FIG. 3f is an opposite end view taken along lines 3f—3f of FIG. 3d.

In alternative embodiments, however, the edge 96 is not necessarily symmetrically disposed between the first and second sides 62 and 63. One of the first and second facets 92 or 93 may for example correspond with one of the first or second sides 62 or 63 of the shank 60 as discussed above. FIGS. 3d–3f show yet another alternative embodiment, wherein the brad point 80 includes a substantially planar surface 91 disposed at an acute angle relative to the longitudinal axis of the shank 60. The substantially planar surface 91 is bounded by substantially opposite sides 62 and 63 and by opposite ends 64 and 65, which in the exemplary embodiment have curved surfaces thereby forming a race-track shaped cross-section as discussed above. The point 80 has a tip 90 defined by the substantially planar surface 91 disposed at an acute angle relative to the longitudinal axis of the shank 60, the substantially opposite first and second sides 62 and 63 of the shank 60, and by one of the first and second ends of the shank, which is end 64 in FIG. 3d. The head of the brads in the alternative embodiment of FIGS. 3d–3f is not shown but corresponds with the head 70 shown in the embodiment of FIGS. 3a–3c, respectively, discussed further below.

As viewed from either side 62 or 63, the angle Φ between the edge 96 in the FIGS. 3a–3c, and the substantially planar surface 91 in FIGS. 3d–3f, and the longitudinal axis of the shank 60 is an acute angle between approximately 60 degrees and approximately 80 degrees, and in one preferred embodiment the angle Φ is approximately 70 degrees. The angle Φ corresponds substantially to the relative angle between the magazine 50 and the channel 24 of the nose-piece 30 of the associated tool, as discussed above.

The head 70 of the brad 30 has a top surface 71 which is disposed at an angle relative to the longitudinal axis of the shank 60 when viewed from the first or second side 62 and 63 of the shank 60, wherein the angle of the top surface 71 slopes oppositely relative to the angle of the edge 96 or the substantially planar surface 91, as shown best in FIGS. 2 and 3a. The magnitude of the angle of the top surface 71 however is not necessarily the same as the magnitude of the angle of the edge 96 or surface 91, although they may be equivalent. FIGS. 3b and 3c show the head 70 of the shank 60 also having first and second opposite side portions 72 and 73 extending outwardly beyond the first and second side surfaces 62 and 63 of the shank.

FIG. 2 shows a plurality of substantially identically configured brads 30 arranged collectively in parallel so as to form the obliquely collated strip of brads 100. In one preferred embodiment, the obliquely collated strip of brads 100 is composed of 50 brads. The substantially opposite first and second sides 62 and 63 of each brad 30 are disposed in corresponding first and second substantially parallel planes of the obliquely collated strip of brads 100. In the embodiment of FIGS. 3a–3c, the edge 96 of each brad 30 forms a substantially continuous edge 110 of the obliquely collated strip of brads 100 shown in FIG. 2. In the alternative embodiment of FIGS. 3d–3f, the substantially planar surface 91 of each brad 30 similarly forms a substantially continuous edge of an obliquely collated strip of brads, which is not shown but is similar to the configuration of FIG. 2. The angle between the substantially continuous edge 110 and the longitudinal axes of the brads 30 is thus between approximately 60 degrees and approximately 80 degrees, and in one preferred embodiment the angle is approximately 70 degrees, as discussed above.

In the exemplary embodiment, the first and second facets 92 and 93 of each brad 30 of the obliquely collated strip of brads 100 converge from the corresponding substantially opposite first and second sides 62 and 63 of the shank 60 so as to form the substantially continuous edge 110 substantially symmetrically between the first and second sides 62 and 63 of the plurality of collectively arranged brads 30 forming the obliquely collated strip of brads 100. The substantially continuous edge 110 may, however, be configured according to the alternative configurations of the edges 96 of individual brads 30 or according to the of alternative configuration shown in FIGS. 3d–3f as suggested above.

FIG. 2 also shows the head 70 of each brad 30 of the obliquely collated strip of brads 100 arranged step-wise relative to the head 70 of each adjacent brad 30, wherein the step-wise arrangement of heads 70 forms a stepped edge 120 substantially parallel to the substantially continuous edge 110 of the obliquely collated strip of brads 100. Also, the head 70 of each brad 30 of the collated strip of brads 100 has a top disposed 71 at an angle relative to the longitudinal axis of the shank 60, wherein the angle of the top surface 71 of the head 70 slopes oppositely relative to the angle of the substantially continuous edge 110 of the obliquely collated strip of brads 100.

Figure 6A:
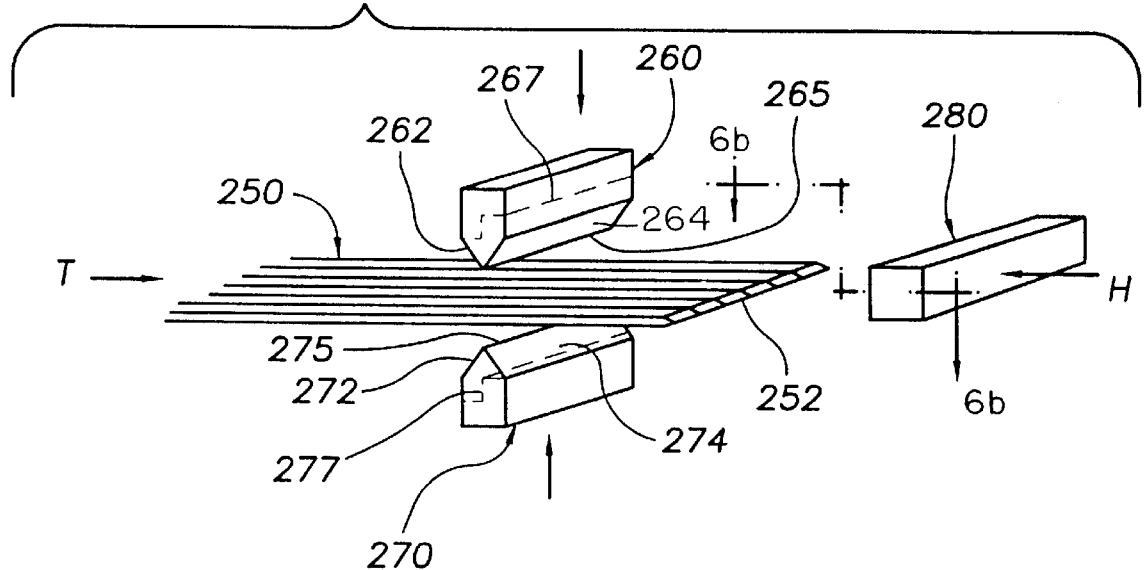
FIG. 6a is a perspective view of an exemplary arrangement for manufacturing an obliquely collated strip of brads according to processes of the present invention.
Figure 5:
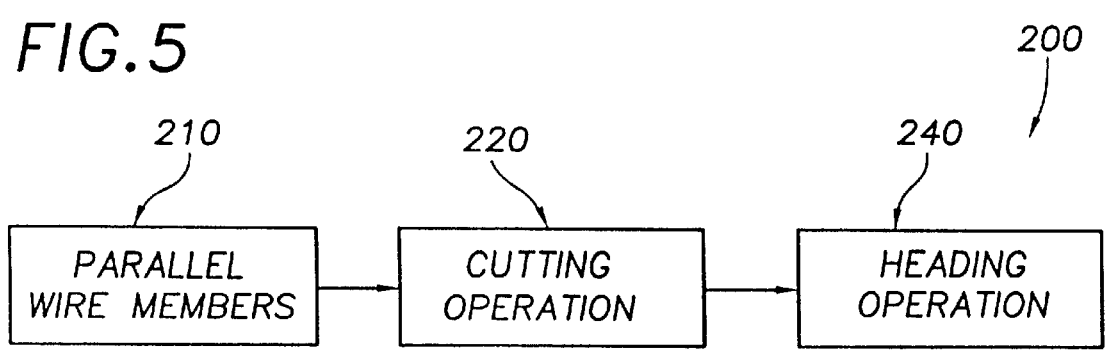
FIG. 5 is a schematic manufacturing flow diagram illustrating exemplary processes for making an obliquely collated strips of brads according to the present invention.

FIG. 5 is a manufacturing flow diagram 200 illustrating schematically the manufacture of the obliquely collated strip of brads 100 according to an exemplary process of the invention. In a first step 210, a plurality of wire members 250 are collectively arranged in parallel as shown in FIG. 6a. In a preferred arrangement, fifty wire members 250 are collectively arranged in parallel and then cut to form obliquely collated strips of brads 100 as discussed further below. The collectively arranged plurality of wire members 250 are cohered together by an adhesive material, such as, for example, nitrocellulose. In accordance with one method of manufacture, the wire members 250 are subject to a wire flattening operation, usually by a rolling member, to provide the race-track shaped cross-section shown in FIG. 4. The wire flattening operation is generally performed before the coherence of the wire members with the adhesive material, or while the applied adhesive material is still plastic, and before the adhesive material hardens.

FIG. 5 further shows a cutting operation 220, and FIG. 6a shows a manufacturing arrangement for performing the cutting operation 220 on the plurality of collectively arranged wire members 250 so as to form a first substantially continuous edge 252 at an acute angle relative to the longitudinal axes of the plurality of collectively arranged wire members 250. FIG. 6a shows the cutting operation 220 performed by cooperating cutting dies 260 and 270 movable substantially transversely relative to a direction of travel T of the plurality of collectively arranged wire members 250. The cutting dies 260 and 270 are arranged at an angle relative to the direction of travel T of the plurality of collectively arranged wire members 250 so as to form the first substantially continuous edge 252 at the acute angle Φ, as discussed above.

A second substantially continuous edge, not shown, is formed on an end portion of a section of the plurality collectively arranged wire members 250 opposite the first substantially continuous edge 252, wherein the section of the plurality collectively arranged wire members 250 ultimately forms an obliquely collated strip of brads. The second substantially continuous edge of the plurality of collectively arranged wire members 250 is also formable by the cooperating cutting dies 260 and 270 of FIG. 6a in a cutting operation, which occurs after the plurality of collectively arranged wire members 250 have been moved toward the heading die 280 in the direction T subsequent to a previous cutting operation forming the first edge 252. The second substantially continuous edge is formed identically and parallel to the first substantially continuous edge 252, and corresponds to the substantially continuous edge 110 of the obliquely collated strip of brads 100 shown in FIG. 2.

FIG. 6a also shows converging cutting surfaces 262 and 264 of the cutting die 260 and converging cutting surfaces 272 and 274 of the cutting die 270 forming corresponding continuous cutting edges 265 and 275, respectively. The cutting edges 265 and 275 of the cutting dies 260 and 270 form the first and second facets 92 and 93 of the substantially continuous edge 110 on the resulting obliquely collated strip of brads 100, as shown in FIGS. 2 and 3a–3c. The continuous cutting edges 265 and 275 of the cutting dies 260 and 270 are considerably less costly to fabricate than prior art stepped cutting dies. Also, the continuous cutting edges 265 and 275 of the cutting dies 260 and 270 are subject to considerably less degradation by the wire members during the cutting operations in comparison to prior art stepped cutting dies.

The alternative point configuration of FIGS. 3d–3f may be formed by cutting dies 260 and 270 having corresponding substantially complementary stepped surfaces 267 and 277, which shear the wire members 250. The alternative substantially complementary stepped surfaces 267 and 277 of the cutting die 260 and 270 are shown in phantom lines in FIG. 6a. The alternate cutting die configurations also have continuous cutting edges which are less costly to fabricate and are subject to less degradation in comparison to prior art stepped cutting dies.

Another step illustrated by the flow diagram of FIG. 5 is a heading operation 240 performed on one of the substantially continuous edges of the plurality of collectively arranged wire members 250 so as to form a head on each of the plurality of collectively arranged wire members 250. FIG. 6a shows the heading operation 240 performed by a heading die 280 movable in a direction H relative to the plurality of collectively arranged wire members 250, which are generally supported by means known in the art during the heading operation 240. In one preferred mode of practicing the invention, the cutting operation 220 occurs simultaneously with the heading operation 240, although the cutting operation 220 may alternatively occur either before or after the heading operation 240, so long as means are provided for supporting the plurality of collectively arranged wire members 250 during the heading operation 240.

Figure 6B:
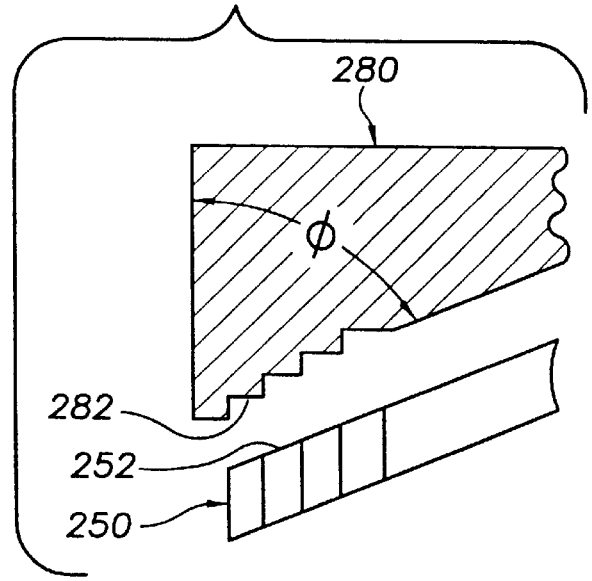
FIG. 6b is a partial sectional view taken along lines 6b—6b of FIG. 6a showing a portion of a stepped heading die and a partially formed obliquely collated strip of brads.

FIG. 6b is a partial sectional view of the heading die 280 of FIG. 6a showing the heading die 280 having a plurality of flat surfaced dies 282 arranged adjacently in a stepped configuration at an angle Φ corresponding to the angle of the first substantially continuous edge 252. Each flat surfaced die 282 is disposed transverse to the longitudinal axis of the plurality of collectively arranged wire members 250, and each flat surfaced die 282 corresponds to one of the plurality of collectively arranged wire members 250. FIG. 6b also shows a portion of the first substantially continuous edge 252 of the plurality of collectively arranged wire members 250 after the cutting operation 220 but before the heading operation 240. The angle of the stepped heading die 280 is parallel to the angle of the first substantially continuous edge 252 of the plurality of collectively arranged wire members 250.

In operation, the heading die 280, and more particularly the plurality of flat surfaced dies 282 thereof apply an axial compressive force to a corresponding wire member of the plurality of collectively arranged wire members 250 along the first substantially continuous edge 252 thereof. Notably, during the heading operation 240, each flat surfaced die 282 unexpectedly forms a head 70 on the corresponding wire member having a top surface 71 at an angle sloping oppositely relative to the angle of the first substantially continuous edge 252 before the heading operation. According to this aspect of the invention, the first substantially continuous edge 252 of the plurality of collectively arranged wire members 250 is formed into the stepped head edge 120 of the obliquely collated strip of brads 100, and the second substantially continuous edge of the plurality of collectively arranged wire member 250 corresponds to the substantially continuous edge 110 of the obliquely collated strip of brads 100, wherein the head 70 of each brad 30 slopes oppositely relative to the corresponding edge 96 as shown in FIG. 2.

In an alternative method of making the obliquely collated strip of brads 100, the top surface 71 of each head 70 is formed substantially 90 degrees relative to the longitudinal axis of the shank 60. For this purpose, the plurality of flat surfaced dies 282 of the heading die 280 of FIG. 6b are each arranged at an angle, which is more parallel to the first substantially continuous edge 252 than is shown in FIG. 6b. According to this method, the angle between the flat surfaced dies 282 and the longitudinal axes of the plurality of wire members 250 is, for example, approximately 85 degrees, as measured counter-clockwise from the flat surfaced die 282 to the shank axis, wherein the precise angle may be determined without undue experimentation.

FIG. 1. shows the obliquely collated strip of brads 100 disposed in an angled magazine 50 of the powered fastener driving tool 10, wherein the magazine 50 sequentially feeds individual brads 30 of the obliquely collated strip of brads 100 into the channel 24 of the nose-piece 20, wherefrom the brads 30 are subsequently discharged by the driver blade 22. The handle 40 and the magazine 50 are disposed on substantially the same side of the driver blade 22 as shown in FIG. 1.

As discussed above and shown in FIGS. 2 and 3, each brad 30 of the obliquely collated strip of brads 100 has a shank with a longitudinal axis, the shank having on one end a head 70 and on an opposite end a point 80 with a tip 90. The obliquely collated strip of brads 100 is disposed in the magazine 50 so that as the individual brads 30 are fed into the channel 24 of the nose-piece 20, the head 70 of the brad 30 is disposed nearest the driver blade 22 and the point 80 of the brad 30 is disposed nearest the aperture 26 of the nose-piece 20. FIG. 1 shows the angle of the substantially continuous edge 110 of the obliquely collated strip of brads 100 disposed in the magazine 50 relative to the longitudinal axes of the brads 30 being substantially the same as the angle of the magazine 50 relative to the axis of the driver blade 22, which is generally parallel to the longitudinal axis of the brads 30.

In operation, the end 64 of the shank 60 defining the tip 90 of each brad 30 is fed first into the channel 24 of the nose-piece 20 by the magazine 50, wherein the end 64 faces away from the direction in which the handle 40 extends. According to this aspect of the invention, the tip 90 of each brad 30 disposed in the channel 22 is located along the end 64 of the brad 30, which is the endmost portion of the brad 30 farthest away from the entrance to the magazine 50.

The point 90 on the brad 30 improves the penetration performance of the brad 30 into the workpiece, notably without any deflection of the brad 30 therefrom, the phenomenon known as skating discussed above, and without any observable adverse effect on brad penetration caused by the wood grain, which may cause shining. Table I below, entitled Penetration Performance Comparison, summarizes test results obtained by driving 1 ½ inch angled chisel point brads of the present invention and 1 ½ inch prior art non-angled chisel point brads into an oak wood abstract with a pneumatic fastener driving tool operated at three different air supply pressures.

TABLE I

PENETRATION PERFORMANCE COMPARISON

| TEST (psi) | NO. TESTS PERFORMED | PRIOR ART (Ave. Drive Depth) | INVENTION (Ave. Drive Depth) |
| --- | --- | --- | --- |
| 70 psi | 20 | 0.871 inches | 0.893 inches |
| 85 psi | 25 | 1.183 inches | 1.210 inches |
| 90 psi | 18 | 1.318 inches | 1.339 inches |

The results of Table 1 show that the novel angled chisel point brads 30 of the present invention tend to penetrate deeper into the target material, or workpiece, in comparison to prior art non-angled chisel point brads. Table II below, entitled Shine Comparison, summarizes test results obtained by driving 134 2.5 inch novel angled chisel point brads of the present invention and 134 2.5 inch prior art non-angled chisel point brads into various wood grains with a pneumatic fastener driving tool.

TABLE II

SHINE COMPARISON

|  | TOTAL TESTED | TOTAL SHINED |
| --- | --- | --- |
| PRIOR ART | 134 | 48 |
| INVENTION | 134 | 28 |

The results of Table II indicate that the angled chisel point brads of the present invention are not more likely to shine than prior art non-angled chisel point brads, and in fact the results of Table II suggests that the novel angled chisel point brads of the present invention are less likely to shine than prior art non-angled chisel point brads, which suggests further that the novel angled chisel point brads of the present invention are less likely to be influenced by wood grain.

According to another aspect of the invention shown in FIG. 1, each brad 30 is disposed in the channel 24 of the nose-piece 20 so that the angle of the head 70 slopes oppositely relative to the angle of the magazine 50. The sloping angle of the brad head 70 tends to improve contact between a tip portion 23 of the driver blade 22 and the head 70 as the fastener driving tool recoils while driving the brad 30 into the workpiece. More particularly, FIG. 1 shows the fastener driving tool 10 recoiling in a direction R, and pivoting usually about the tool operator's wrist and elbow, which are extending from the operator's hand gripping the handle 40. The angled head 70 of the brad 30 slopes in a direction that tends to keep the tip 23 of the driver blade 22 in with the brad head 70 as the fastener driving tool 10 recoils, thereby compensating somewhat for recoil of the tool 10. As a result, the tendency of the driver blade 22 to slip off the brad head 70 may be reduced, which correspondingly reduces the possibility that the workpiece will be damaged by a misguided driver blade tip 23. In addition to the improved penetration performance resulting from the novel angled point 80, any improved contact between the driver blade 22 and the brad 30 also very likely contributes to the improved penetration performance of the brad 30 into the workpiece.

While the foregoing written description of the invention enables anyone skilled in the art to make and use what is at present considered to be the best mode of the invention, it will be appreciated and understood by anyone skilled in the art the existence of variations, combinations, modifications and equivalents within the spirit and scope of the specific exemplary embodiments disclosed herein. The present invention therefore is to be limited not by the specific exemplary embodiments disclosed herein but by all embodiments within the scope of the appended claims.

What is claimed is:

1. A collated strip of brads useable in an angled magazine of a fastener driving tool, each brad having a shank with a longitudinal axis, the shank having a head on a first end and a point on a second opposite end, comprising:

a plurality of brads arranged collectively in parallel and obliquely so as to form a collated strip of oblique brads; and said point of each brad of said collated strip of brads having a tip defined by converging first, second, and third surfaces, wherein at least one of said first and second surfaces is angled from a corresponding one of substantially opposite first and second sides of said shank of each brad so as to form an edge which is disposed at an acute angle relative to said longitudinal axis of said shank such that said edge of each brad of said collated strip of brads forms a substantially continuous edge of said collated strip of brads, and said tip of said point of each one of said brads is asymmetrically offset with respect to said longitudinal axis of its corresponding brad.

2. The collated strip of brads of claim 1, wherein:

said substantially opposite first and second sides of said shank of each brad of said collated strip of brads are disposed within corresponding first and second substantially parallel planes.

3. The collated strip of brads as set forth in claim 1, wherein:

said first, second, and third surfaces of each one of said brads respectively comprise first and second facets and a third side of said shank of said brad.

4. The collated strip of brads of claim 3, wherein:

said first and second facets of each brad of said collated strip of brads both converge from said corresponding substantially opposite first and second sides of said shank so as to form said edge substantially symmetrically between said first and second sides of said shank.

5. The collated strip of brads of claim 3, wherein:

said third surface of each one of said brads defined by said third side of said shank of said brad and defining said tip of each brad of said collated strip of brads is formed by an end of said shank.

6. The collated strip of brads of claim 5, wherein the shank of each brad of the collated strip of brads has having substantially opposite curved first and second ends, whereby the shank has a substantially race-track shaped cross-section.

7. The collated strip of brads of claim 1, wherein:

said head of each brad of said collated strip of brads is arranged step-wise relative to the head of an adjacent brad of said collated strip of brads whereby said step-wise arrangement of said heads of said brads forms a stepped edge substantially parallel to said substantially continuous edge of said collated strip of brads.

8. The collated strip of brads of claim 7, wherein the angle of the continuous edge of the collated strip of brads is approximately 70 degrees relative to the longitudinal axis of the shank of each brad.

9. The collated strip of brads of claim 7, wherein:

said head of each brad of said collated strip of brads has a top surface which is disposed at an angle relative to the longitudinal axis of the shank such that each head is disposed at an angle which slopes opposite to said angle of said substantially continuous edge of said collated strip of brads.

10. A collated strip of brads useable in an angled magazine of a fastener driving tool, each brad having a shank with a longitudinal axis, the shank having a head on a first ends, a point on a second opposite end, and substantially opposite first and second sides and substantially opposite first and second ends, comprising:

a plurality of brads arranged collectively in parallel and obliquely so as to form a collated strip of oblique brads; and said point of each brad of said collated strip of brads has a tip defined by a substantially planar surface disposed at an acute angle relative to said longitudinal axis of said shank, said substantially opposite first and second sides of said shank, and at least one of said first and second ends of the said shank, said substantially planar surface of each brad of said collated strip of brads forms a substantially continuous edge of said collated strip of brads, and said tip of said point of each one of said brads is asymmetrically offset with respect to said longitudinal axis of its corresponding brad.

11. The collated strip of brads as set forth in claim 10, wherein:

said tip of each brad of said collated strip of brads is defined by converging first, second, and third surfaces.

12. The collated strip of brads as set forth in claim 11, wherein:

said first, second, and third surfaces of each one of said brads respectively comprise first and second facets and one of said first and second ends of said shank of said brad.

13. The collated strip of brads as set forth in claim 12, wherein:

said first and second facets of each brad of said collated strip of brads both converge from said corresponding substantially opposite first and second sides of said shank so as to form said substantially planar surface substantially symmetrically between said first and second sides of said shank.

14. The collated strip of brads of claim 10, wherein:

said substantially opposite first and second sides of said shank of each brad of said collated strip of brads are disposed within corresponding first and second substantially parallel planes.

15. The collated strip of brads of claim 10, wherein the shank of each brad of the collated strip of brads has substantially opposite curved first and second ends, whereby the shank has a substantially race-track shaped cross-section.

16. The collated strip of brads of claim 10, wherein the angle of the continuous edge of the collated strip of brads is approximately 70 degrees relative to the longitudinal axis of the shank of each brad.

17. The collated strip of brads of claim 10, wherein:

said head of each brad of said collated strip of brads is arranged step-wise relative to the head of an adjacent brad of said collated strip of brads whereby said step-wise arrangement of said heads of said brads forms a stepped edge substantially parallel to said substantially continuous edge of said collated strip of brads.

18. The collated strip of brads of claim 17, wherein:

said head of each brad of said collated strip of brads has a top surface which is disposed at an angle relative to said longitudinal axis of said shank such that each head is disposed at an angle which slopes opposite to said angle of said substantially continuous edge of said collated strip of brads.

* * * * *